L. HINESLY.
Cultivator and Seeder.
No. 232,183. Patented Sept. 14, 1880.
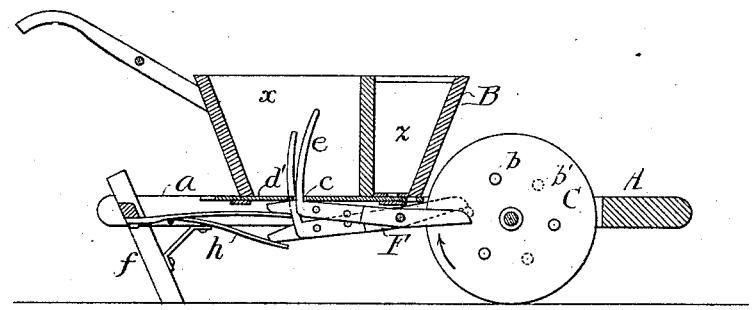
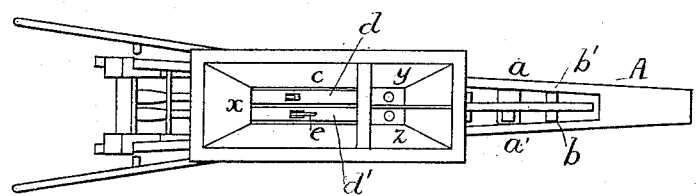

UNITED STATES PATENT OFFICE.

LINZY HINESLY, OF ATHENS, GEORGIA.

CULTIVATOR AND SEEDER.

SPECIFICATION forming part of Letters Patent No. 232,183, dated September 14, 1880.

Application filed February 18, 1880.

*To all whom it may concern:*

Be it known that I, LINZY HINESLY, of Athens, Clarke county, Georgia, have invented Improvements in Cultivators and Seeders, of which the following is a specification.

My invention is a planter constructed, as fully described hereinafter, so as to plant one or more kinds of seed in different quantities, as desired, or so as to plant seed and distribute fertilizer.

The construction is also such as to permit the device to be readily converted into a cultivator.

In the drawings forming part of this specification, Figure 1 is a longitudinal section of my improved planter; Fig. 2, a plan view.

The frame A consists of side bars, $a$ $a'$, connected at front and rear, and supports a hopper, B, divided into three compartments, $x$ $y$ $z$, and is supported at the front by a wheel, C, having at the opposite sides pins $b$ $b'$.

Beneath the hopper are arranged two seed-slides, $d$ $d'$, through an opening, $c$, in each of which passes a long curved finger, $e$, extending into the compartment $x$ from a lever, F, pivoted below the hopper. At the rear are stocks $f$, for the attachment of the usual covering-plows. Each lever F extends to one side of the wheel C, and the spring $h$ tends to throw the rear end upward. Different kinds of seeds are placed in the several compartments, or seed is placed in the compartments $y$ $z$ and fertilizer in the hopper $x$. As the wheel C turns in the direction of the arrow the pins $d$ $d'$ strike and vibrate the levers, moving the slides and feeding the seed from either or both compartments $y$ $z$, while the stirring-fingers $e$ $e$ stir and cause the fertilizer to pass down between the slides.

It will be seen that by simply varying the arrangement of the pins any distribution may be effected, that one or more compartments may be used, and that by removing the hopper a frame suitable for a cultivator-plow stock is obtained.

I claim—

The combination of the frame A, wheel C, its pins $b$ $b'$, levers F F, having fingers $e$, and hopper B, divided into compartments $x$ $y$ $z$, and slides $d$ $d'$, forming the bottom of the compartment $x$, and operated by the fingers $e$, as specified.

In testimony whereof I have signed my name to this specification in the presence of two subscribing witnesses.

LINZY $\overset{\text{his}}{\times}$ HINESLY.
mark.

Witnesses:
 JAMES WHITE,
 JAS. A. CARLTON.